(12) United States Patent
Park et al.

(10) Patent No.: US 11,795,313 B2
(45) Date of Patent: Oct. 24, 2023

(54) RUBBER COMPOSITION FOR FUEL-CELL COOLING HOSE AND FUEL-CELL COOLING HOSE USING SAME

(71) Applicants: HYUNDAI MOTOR COMPANY, Seoul (KR); KIA CORPORATION, Seoul (KR)

(72) Inventors: Jong Min Park, Incheon (KR); Yong Jun Cho, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/325,551

(22) Filed: May 20, 2021

(65) Prior Publication Data

US 2022/0089851 A1 Mar. 24, 2022

(30) Foreign Application Priority Data

Sep. 21, 2020 (KR) .................. 10-2020-0121134

(51) Int. Cl.
*C08L 23/16* (2006.01)
*C08K 3/013* (2018.01)
*C08K 3/04* (2006.01)
*C08K 3/22* (2006.01)
*C08K 3/36* (2006.01)
*C08K 5/00* (2006.01)
*C08K 5/01* (2006.01)
*C08K 5/14* (2006.01)
*C08K 3/26* (2006.01)

(52) U.S. Cl.
CPC .............. *C08L 23/16* (2013.01); *C08K 3/013* (2018.01); *C08K 3/04* (2013.01); *C08K 3/36* (2013.01); *C08K 5/0016* (2013.01); *C08K 5/01* (2013.01); *C08K 5/14* (2013.01); *C08K 2003/2296* (2013.01); *C08K 2003/265* (2013.01); *C08L 2205/025* (2013.01); *C08L 2314/02* (2013.01); *C08L 2314/06* (2013.01)

(58) Field of Classification Search
None
See application file for complete search history.

(56) References Cited

FOREIGN PATENT DOCUMENTS

| CN | 104744827 A | 7/2015 | |
|---|---|---|---|
| CN | 105837954 A | 8/2016 | |
| CN | 111247202 A | 6/2020 | |
| EP | 2886596 A1 * | 6/2015 | ............ B29C 35/02 |
| EP | 3276075 A1 | 1/2018 | |
| JP | 2006-059683 A | 3/2006 | |
| KR | 10-1994-0014583 A | 7/1994 | |
| KR | 20120126165 A * | 11/2012 | |
| KR | 10-2020-0036673 A | 4/2020 | |

* cited by examiner

*Primary Examiner* — Richard A Huhn
(74) *Attorney, Agent, or Firm* — Morgan, Lewis & Bockius LLP

(57) ABSTRACT

A rubber composition for a fuel-cell cooling hose may include: a base resin including an ethylene-propylene-diene monomer (EPDM); a reinforcing agent; an activating agent; a plasticizer; and a crosslinking agent.

10 Claims, No Drawings

RUBBER COMPOSITION FOR FUEL-CELL COOLING HOSE AND FUEL-CELL COOLING HOSE USING SAME

CROSS REFERENCE TO RELATED APPLICATION

The present application claims priority to and the benefit of Korean Patent Application No. 10-2020-0121134, filed on Sep. 21, 2020, the entire content of which are incorporated herein by reference.

FIELD

The present disclosure relates to a rubber composition for a fuel-cell cooling hose and a fuel-cell cooling hose using the same.

BACKGROUND

The statements in this section merely provide background information related to the present disclosure and may not constitute prior art.

Fossil fuels are still the world's main energy source, but the transition of society to eco-friendly energy in the future is accelerating due to many environmental issues. Accordingly, the automotive industry is also spurring the development and application of eco-friendly vehicles (hybrid vehicles, electric vehicles, etc.). Among these, a fuel-cell electric vehicle (FCEV) is a vehicle that runs by supplying electric power to an electric motor through the electrochemical actions of hydrogen and oxygen serving as fuels (using fuel cells). A hydrogen electric vehicle is emerging as a pollution-free eco-friendly vehicle due to the emission of only water or steam and high energy efficiency compared to existing internal combustion engines.

However, fuel-cell electric vehicles are lagging behind electric vehicles in commercialization due to high vehicle prices and insufficient hydrogen-charging infrastructure.

Meanwhile, among MEAS (membrane-electrode assemblies), gaskets, separators, and cooling systems used for fuel-cell stacks in fuel-cell electric vehicles, in particular, in the case of cooling hoses in cooling systems, a water-cooling-type cooling system using a cooling water channel has been applied to maintain desired temperature and improve efficiency. In the water-cooling-type cooling system, a rubber hose is used as a flow passage for supplying cooling water.

However, in the case in which ions in the form of metal oxides in the rubber material are dissolved in the cooling water and are introduced in excess, catalytic activity is suppressed due to catalyst poisoning in the membrane-electrode assembly, thereby lowering fuel cell efficiency. Electricity generated in the stack due to the introduced ions flows through the cooling water, and may cause a shock to electric devices and driving parts, which is undesirable.

In order to inhibit the above problems, many attempts to reduce damage thereto, such as applying a control logic in a specific section, installing an ion filter, or using silicone rubber, have been made, but the expenses and costs related to such processes are high.

SUMMARY

The present disclosure provides a rubber composition for a fuel-cell cooling hose capable of efficiently reducing ion dissolution and maintaining durability and economic benefits and a fuel-cell cooling hose using the same.

One form of the present disclosure provides a rubber composition for a fuel-cell cooling hose, including: 40 to 62 wt % of a base resin including an ethylene-propylene-diene monomer (EPDM); 30 to 52 wt % of a reinforcing agent; 2 to 4 wt % of an activating agent; 2 to 3 wt % of a plasticizer; and 1 to 2 wt % of a crosslinking agent.

The base resin may include at least one material selected from the group consisting of a metallocene-based EPDM and a Ziegler-Natta-based EPDM.

The base resin may include the metallocene-based EPDM alone, or may include the metallocene-based EPDM and the Ziegler-Natta-based EPDM at a weight ratio of 1:0.3-2.5.

The reinforcing agent may include at least one material selected from the group consisting of carbon black, silica, and calcium carbonate.

The carbon black may have a dibutylphthalate (DBP) oil absorption rate of 40 to 150 ml/100 g and an iodine adsorption number I2 of 10 to 50 mg/g.

The activating agent may include: 0.5 to 1 wt % of zinc oxide (ZnO); 0.5 to 1 wt % of a thermoplastic olefin (TPO); and 1 to 2 wt' of steric acid.

The weight ratio of the zinc oxide (ZnO) to the thermoplastic olefin (TPO) is 1:1-2.

The thermoplastic olefin (TPO) may have a specific gravity of 0.85 to 0.9 g/cm$^3$ and a melt index (MI) of 0.3 to 0.7 g/10 min (190° C./2.16 kg).

The plasticizer may include at least one substance selected from the group consisting of paraffin oil, naphthalene oil, and aromatic oil.

The crosslinking agent may include at least one compound selected from the group consisting of dicumyl peroxide (DCP), butyl peroxybenzoate, and butylperoxy hexane.

The rubber composition may further include 1 to 2 wt % of an anti-aging agent.

Another form of the present disclosure provides a fuel-cell cooling hose manufactured by crosslinking the rubber composition described above and having an ion dissolution rate of 0.7 to 7.0 μS/cm.

The present disclosure pertains to a rubber composition for a fuel-cell cooling hose and a fuel-cell cooling hose using the same. The rubber composition for the cooling hose according to the present disclosure can be prepared from inexpensive materials, and moreover a fuel-cell cooling hose is manufactured by subjecting the composition to an extrusion process, which is economically advantageous. Moreover, the fuel-cell cooling hose manufactured using the rubber composition of the present disclosure can exhibit desirable negative-pressure resistance, durability such as bursting strength, and the like, and also, ion dissolution can be effectively prevented, thus increasing the lifetime of a fuel cell.

Further areas of applicability will become apparent from the description provided herein. It should be understood that the description and specific examples are intended for purposes of illustration only and are not intended to limit the scope of the present disclosure.

DETAILED DESCRIPTION

The following description is merely exemplary in nature and is not intended to limit the present disclosure, application, or uses. It should be understood that throughout the drawings, corresponding reference numerals indicate like or corresponding parts and features.

The above and other objectives, features and advantages of the present disclosure will be more clearly understood from the following preferred forms taken in conjunction with the accompanying drawings. However, the present disclosure is not limited to various forms disclosed herein, and may be modified into different forms. These forms are provided to thoroughly explain the disclosure and to sufficiently transfer the spirit of the present disclosure to those skilled in the art.

It will be further understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it can be directly on the other element, or intervening elements may be present therebetween. Similarly, when an element such as a layer, film, area, or sheet is referred to as being "under" another element, it can be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases. Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

Ion dissolution in a conventional fuel-cell cooling hose may be reduced when a metal-oxide-type base resin and a chemical additive are removed from the rubber composition for a fuel-cell cooling hose, but in this case the product is not properly molded or the properties thereof are greatly deteriorated, so negative-pressure resistance and durability required of the hose cannot be satisfied, which is undesirable.

Therefore, based on the results of intensive research by the inventors of the present disclosure, it was found that when the type and amount of a base resin and the types and amounts of a reinforcing agent and an activating agent are optimized, ion dissolution may be effectively and economically inhibited and high durability may also be attained at the same time, thus culminating in the present disclosure.

In one form of the present disclosure, the rubber composition for a fuel-cell cooling hose includes a base resin including EPDM, a reinforcing agent, an activating agent, and a crosslinking agent. Preferably, the rubber composition includes 40 to 62 wt % of the base resin including EPDM, 30 to 52 wt % of the reinforcing agent, 2 to 4 wt % of the activating agent, 2 to 3 wt % of the plasticizer, and 1 to 2 wt % of the crosslinking agent.

In one form of the present disclosure, the base resin may include a resin, preferably EPDM, capable of reducing the amounts of impurities such as catalysts, etc. that may be included in the base resin during the preparation thereof.

In one form of the present disclosure, the base resin may include at least one selected from the group consisting of metallocene-based EPDM and Ziegler-Natta-based EPDM, among EPDM materials, in order to provide performance of a part made therefrom, such as antifreeze resistance, heat resistance, and durability. The metallocene-based EPDM may be EPDM prepared using a metallocene catalyst, and the Ziegler-Natta-based EPDM may be EPDM prepared using a Ziegler-Natta catalyst. Preferably, the metallocene-based EPDM is used alone, or is used in a mixture with the Ziegler-Natta-based EPDM at a weight ratio of 1:0.3-2.5. When the base resin includes the metallocene-based EPDM, there is an advantage in that the amount of impurities contained therein is reduced. If the weight ratio of the metallocene-based EPDM to the Ziegler-Natta-based EPDM is less than 1:0.3, material costs may be excessively increased. On the other hand, if the weight ratio thereof exceeds 1:2.5, metal impurities remaining in the Ziegler-Natta-based EPDM may be generated as ions, which deteriorates the performance of the stack.

In one form of the present disclosure, the amount of the base resin is 40 to 62 wt % based on a total of 100 wt % of the rubber composition for a fuel-cell cooling hose. If the amount of the base resin is less than 40 wt %, elasticity, which is an inherent property of rubber products, may be deteriorated, and durability may be deteriorated. On the other hand, if the amount thereof exceeds 62 wt %, mechanical properties may not be provided and thus fatigue performance may be worsened in the long term.

The reinforcing agent according to one form of the present disclosure may include at least one material selected from the group consisting of carbon black, silica, and calcium carbonate, in order to attain electrical insulation resistance and processability as well as mechanical properties such as durability and the like of the rubber for a cooling hose manufactured using the composition including the same. Although not limited to including a specific component, the use of carbon black, capable of providing fatigue resistance and robustness, is preferable.

The carbon black that may be included in the reinforcing agent according to one form of the present disclosure has a dibutylphthalate (DBP) oil absorption rate of 40 to 150 ml/100 g and an iodine adsorption number I2 of 10 to 50 mg/g. If the dibutylphthalate (DBP) oil absorption rate of the carbon black is less than 40 ml/100 g, durability may be deteriorated due to internal heating. On the other hand, if it exceeds 150 ml/100 g, molding defects may occur upon extrusion molding of hose parts. Also if the iodine adsorption number I2 of the carbon black is less than 10 mg/g, it is difficult to maintain elasticity due to weak binding energy between rubber and carbon black. On the other hand, if it exceeds 50 mg/g, carbon black is not properly dispersed, which may cause breakage due to aggregation between particles.

The amount of the reinforcing agent according to one form of the present disclosure may be 30 to 52 wt % based on a total of 100 wt % of the rubber composition for a fuel-cell cooling hose. If the amount of the reinforcing agent is less than 30 wt %, the viscosity of the composition including the same is low, making it difficult to mold parts for rubber production, and mechanical properties are not be provided, making it difficult to attain durability. On the other hand, if the amount thereof exceeds 52 wt %, the unreacted reinforcing agent may increase the extent of ion dissolution, which is undesirable.

The activating agent according to one form of the present disclosure preferably includes at least one selected from the group consisting of zinc oxide (ZnO), thermoplastic olefin (TPO), and stearic acid, in order to attain not only processability for manufacturing the fuel-cell cooling hose but also the mechanical properties of the fuel-cell cooling hose.

The thermoplastic olefin (TPO) that may be included in the activating agent according to one form of the present disclosure may include at least one selected from the group consisting of an EPDM/PP alloy and an EPDM/PE alloy. The use of an EPDM/PP alloy, having superior compatibility with materials, is preferable.

The thermoplastic olefin (TPO) has a specific gravity of 0.85 to 0.9 g/cm$^3$ and a melt index (MI) of 0.3 to 0.7 g/10 min (190° C./2.16 kg). If the specific gravity of the thermoplastic olefin (TPO) is less than 0.85 g/cm$^3$, mixing efficiency may decrease during the compounding process. On the other hand, if the specific gravity thereof exceeds 0.9 g/cm$^3$, extrusion molding is not properly performed due to the increased viscosity of the compound. Also, if the MI of the thermoplastic olefin (TPO) is less than 0.3 g/10 min, partial hardening may occur due to poor material dispersion, undesirably deteriorating durability. On the other hand, if the MI thereof exceeds 0.7 g/10 min, production efficiency may be lowered due to the load during product molding.

The weight ratio of zinc oxide (ZnO) to thermoplastic olefin (TPO), which may be included in the activating agent according to one form of the present disclosure, may be 1:1-2. If the weight ratio thereof is less than 1:1, ion dissolution may increase. On the other hand, if the weight ratio thereof exceeds 1:2, the product may not be extruded due to the high crosslinking density and thus processability may be deteriorated, and the mechanical properties, particularly bursting strength, of the fuel-cell cooling hose manufactured therefrom may thus be deteriorated.

The activating agent according to one form of the present disclosure may include, based on a total of 100 wt % of the rubber composition for a fuel-cell cooling hose, 0.5 to 1 wt % of zinc oxide (ZnO), 0.5 to 1 wt % of thermoplastic olefin (TPO), and 1 to 2 wt % of steric acid.

If the amount of zinc oxide in the activating agent according to one form of the present disclosure is less than 0.5 wt %, crosslinking with the accelerator of the compound does not occur properly, undesirably lowering heat resistance. On the other hand, if the amount thereof exceeds 1 wt %, the unreacted activating agent may be ionized and may thus be dispersed in the antifreeze, undesirably lowering the stack performance efficiency of the fuel cell. Also, if the amount of the thermoplastic olefin (TPO) in the activating agent according to one form of the present disclosure is less than 0.5 wt %, the appearance of the product is poor due to poor product moldability. On the other hand, if the amount thereof exceeds 1 wt %, the fatigue performance of the hose may be deteriorated due to partial hardening of the product. Also, if the amount of stearic acid in the activating agent according to one form of the present disclosure is less than 1 wt %, the mechanical properties may be deteriorated because the crosslinking reaction is not properly carried out. On the other hand, if the amount thereof exceeds 2 wt %, the residual metal-based activating agent may be ionized, undesirably deteriorating product performance.

The plasticizer according to one form of the present disclosure may include at least one substance selected from the group consisting of paraffin oil, naphthalene oil, and aromatic oil, in order to attain manufacturing performance such as extrusion performance, etc. when manufacturing a fuel-cell cooling hose using the composition including the same. Although not limited to including a specific component, the use of paraffin oil, having a similar solubility index and thus high efficiency, is preferable.

The amount of the plasticizer according to one form of the present disclosure may be 2 to 3 wt % based on a total of 100 wt % of the rubber composition for a fuel-cell cooling hose. If the amount of the plasticizer is less than 2 wt %, the viscosity may be greatly increased upon rubber compounding, making it difficult to perform extrusion molding. On the other hand, if the amount thereof exceeds 3 wt %, mechanical properties may be deteriorated, undesirably lowering durability.

The crosslinking agent according to one form of the present disclosure may include, as a peroxide-based crosslinking agent, at least one selected compound from the group consisting of dicumyl peroxide (DCP), butyl peroxybenzoate, and butylperoxy hexane, in order to manufacture rubber for a fuel cell through crosslinking during the preparation of the composition of the present disclosure and also to inhibit ion dissolution. Although not limited to including a specific type, the use of dicumyl peroxide (DCP), having high vulcanization efficiency, is preferable.

The amount of the crosslinking agent according to one form of the present disclosure may be 1 to 2 wt % based on a total of 100 wt % of the rubber composition for a fuel-cell cooling hose. If the amount of the crosslinking agent is less than 1 wt %, crosslinking density capable of providing mechanical properties cannot be obtained. On the other hand, if the amount thereof exceeds 2 wt %, manufacturing efficiency may be lowered due to the excessively long crosslinking time.

The rubber composition for a fuel-cell cooling hose according to one form of the present disclosure may further include an anti-aging agent capable of inhibiting changes in the properties due to heat generated from vehicles. The anti-aging agent according to one form of the present disclosure may include at least one selected substance from the group consisting of 3D (N'-isopropyl-N-phenyl-phenylenediamine) and a phenol-based anti-aging agent (2,6-d-Di-tert-butyl-4-methylphenol). Although not limited to including a specific component, the use of 3D (N'-isopropyl-N-phenyl-phenylenediamine), having high compounding compatibility, is preferable.

The amount of the antioxidant according to one form of the present disclosure may be 1 to 2 wt % based on a total of 100 wt % of the rubber composition for a fuel-cell cooling hose. If the amount of the antioxidant is less than 1 wt %, heat resistance may become weak due to deteriorated performance of the anti-aging agent. On the other hand, if the amount thereof exceeds 2 wt %, rubber parts may be scorched.

The rubber composition for a fuel-cell cooling hose according to one form of the present disclosure includes the above components in specific amounts, and may thus be prepared using inexpensive materials. Moreover, a fuel-cell cooling hose is manufactured by extruding the above composition, thus generating economic benefits.

In addition, the fuel-cell cooling hose according to one form of the present disclosure is manufactured by crosslinking the rubber composition described above.

Specifically, the fuel-cell cooling hose manufactured using the rubber composition for a fuel-cell cooling hose according to one form of the present disclosure may exhibit desirable negative-pressure resistance, durability such as bursting strength, and the like, and may effectively inhibit ion dissolution, so the ion dissolution rate is merely 0.7 to 7.0 μS/cm, thus increasing the lifetime of a fuel cell to thereby provide the performance of the fuel cell.

A better understanding of the present disclosure may be obtained through the following examples. These examples are merely set forth to illustrate the present disclosure, and are not to be construed as limiting the scope of the present disclosure.

Examples 1 to 5 and Comparative Examples 1 to 10: Manufacture of fuel-cell cooling hose Test samples were manufactured using components in the amounts shown in Table 1 below. Specifically, a base resin was masticated for 3 min using a kneader. Then, the masticated base resin was simultaneously mixed with a reinforcing agent, an activating agent, a plasticizer, and an anti-aging agent, kneaded for 3 to 4 min, and cleaned for 1 to 2 min, thus obtaining a CMB (Carbon Master Batch). Then, the CMB compound was mixed with a crosslinking agent using a roll mixer. Then, the period of time desired to appropriately vulcanize the rubber composition thus obtained was measured using a rheometer, followed by hot pressing at 160 kgf/cm$^2$ using a hot press, thereby manufacturing test samples.

TABLE 1

| Example or Comparative Example (wt %) | | Ex. 1 | Ex. 2 | Ex. 3 | Ex. 4 | Ex. 5 | C. Ex. 1 | C. Ex. 2 | C. Ex. 3 | C. Ex. 4 | C. Ex. 5 | C. Ex. 6 | C. Ex. 7 | C. Ex. 8 | C. Ex. 9 | C. Ex. 10 |
|---|---|---|---|---|---|---|---|---|---|---|---|---|---|---|---|---|
| A | EPDM (Ziegler-Natta) | 0 | 36 | 25.75 | 15.45 | 0 | 51.5 | 0 | 0 | 0 | 0 | 0 | 0 | 0 | 0 | 0 |
|   | EPDM (Metallocene) | 51.5 | 15.5 | 25.75 | 36.05 | 50.5 | 0 | 31.5 | 71.5 | 50.5 | 50.5 | 50.5 | 51.5 | 51.5 | 52 | 49 |
| B | Carbon black (FEF) | 40 | 40 | 40 | 40 | 40 | 40 | 60 | 20 | 40 | 40 | 40 | 40 | 40 | 40 | 40 |
| C | N'-isopropyl-N-phenyl-phenylene-diamine | 1 | 1 | 1 | 1 | 1 | 1 | 1 | 1 | 1 | 1 | 1 | 1 | 1 | 1 | 1 |
| D | ZnO | 1 | 1 | 1 | 1 | 1 | 1 | 1 | 1 | 0 | 2 | 3 | 1 | 1 | 1 | 1 |
|   | TPO | 2 | 2 | 2 | 2 | 2 | 2 | 2 | 2 | 4 | 2 | 1 | 2 | 2 | 2 | 2 |
|   | S/Acid | 1 | 1 | 1 | 1 | 1 | 1 | 1 | 1 | 1 | 1 | 1 | 1 | 1 | 1 | 1 |
| E | Paraffin oil | 2.5 | 2.5 | 2.5 | 2.5 | 2.5 | 2.5 | 2.5 | 2.5 | 2.5 | 2.5 | 2.5 | 2.5 | 2.5 | 1 | 4 |
| F | Sulfur/CZ | 0 | 0 | 0 | 0 | 0 | 0 | 0 | 0 | 0 | 0 | 0 | 1 | 0.5 | 1 | 1 |
|   | DCP | 1 | 1 | 1 | 1 | 2 | 1 | 1 | 1 | 1 | 1 | 1 | 0 | 0.5 | 1 | 1 |
|   | Total | 100 | 100 | 100 | 100 | 100 | 100 | 100 | 100 | 100 | 100 | 100 | 100 | 100 | 100 | 100 |

A: Base resin
B: Reinforcing agent
C: Anti-aging agent
D: Activating agent
E: Plasticizer
F: Crosslinking agent Measurement of Properties Hardness: measured using dumbbell No. 3 in accordance with KS M 6784

Tensile strength and elongation: measured using dumbbell No. 3 in accordance with KS M 6782

Ion dissolution rate: measured by MS263-19, ion dissolution evaluation method

Bursting strength: measured by MS263-19, burst evaluation method

Test Examples: Comparison of Properties and Ion Dissolution of Fuel-Cell Cooling Hose The fuel-cell cooling hose of each of Examples 1 to 5 and Comparative Examples 1 to 10 was manufactured, and the properties of the fuel-cell cooling hose and the ion dissolution thereof were measured. The results thereof are shown in Table 2 below.

TABLE 2

| Example or Comparative Example (wt %) | Ex. 1 | Ex. 2 | Ex. 3 | Ex. 4 | Ex. 5 | C. Ex. 1 | C. Ex. 2 | C. Ex. 3 | C. Ex. 4 |
|---|---|---|---|---|---|---|---|---|---|
| Hardness (Hs) | 65 | 65 | 66 | 64 | 67 | 64 | 72 | 56 | 60 |
| Tensile strength (kgf/cm$^2$) | 140 | 137 | 136 | 139 | 153 | 135 | 160 | 81 | 103 |
| Elongation (%) | 380 | 350 | 370 | 370 | 360 | 360 | 240 | 320 | 420 |
| Ion dissolution rate (electrical conductivity, μS/cm) | 0.8 | 6.4 | 4.9 | 3.8 | 1.3 | 8.6 | 12.4 | 0.3 | 0.9 |
| Product bursting strength (kgf/cm$^2$) | 15.4 | 14.8 | 15.1 | 15.2 | 16.2 | 14.8 | 16.9 | — | 5.3 |
| Product moldability | Good | Good | Good | Good | Good | Good | Good | Not good | Not good |

TABLE 2-continued

| Example or Comparative Example (wt %) | C. Ex. 5 | C. Ex. 6 | C. Ex. 7 | C. Ex. 8 | C. Ex. 9 | C. Ex. 10 |
|---|---|---|---|---|---|---|
| Hardness (Hs) | 63 | 64 | 62 | 59 | 70 | 59 |
| Tensile strength (kgf/cm$^2$) | 130 | 135 | 130 | 83 | 160 | 110 |
| Elongation (%) | 350 | 340 | 330 | 160 | 300 | 430 |
| Ion dissolution rate (electrical conductivity, μS/cm) | 4.3 | 12.8 | 8.9 | 3.5 | 2.8 | 7.3 |
| Product bursting strength (kgf/cm$^2$) | 12.3 | 14.8 | 14.5 | — | — | 9.3 |
| Product moldability | Good | Good | Good | Not good | Not good | Good |

As is apparent from Tables 1 and 2, in Example 1, in which the metallocene-based EPDM alone was used in an amount of 40 to 62 wt %, the ion dissolution rate was the lowest, and mechanical properties such as hardness, tensile strength, elongation, product bursting strength and the like were superior. In Examples 2 and 3, in which the weight ratio of metallocene-based EPDM to Ziegler-Natta-based EPDM was 1:0.3-2.5, the ion dissolution rate was reduced and mechanical properties were superior. In Example 5, in which the crosslinking agent was used in a large amount of 2 wt %, the ion dissolution rate was reduced and mechanical properties were superior. However, in Comparative Example 1, using the base resin including the Ziegler-Natta-based EPDM alone, the ion dissolution rate was relatively high. In Comparative Examples 2 and 3, in which the amount of the reinforcing agent was outside the range of the present disclosure, the ion dissolution rate was high, or product moldability was poor, resulting in deteriorated manufacturing performance. In Comparative Examples 4 and 6, in which the weight ratio of zinc oxide (ZnO) to thermoplastic olefin (TPO) in the activating agent did not satisfy 1:1-2, product moldability was poor, resulting in deteriorated manufacturing performance, or the ion dissolution rate was high. In Comparative Example 5, in which the weight ratio of zinc oxide (ZnO) to thermoplastic olefin (TPO) in the activating agent satisfied 1:1-2 but the amounts thereof exceeded the upper limits of the present disclosure, mechanical properties were poor due to low product bursting strength. In Comparative Examples 7 and 8, in which the sulfide-based crosslinking agent was used alone or in combination with the peroxide-based crosslinking agent, the ion dissolution rate was high, or product moldability was poor, resulting in deteriorated manufacturing performance. In Comparative Examples 9 and 10, in which the amount of the plasticizer was outside the range of the present disclosure, product moldability was poor, resulting in deteriorated manufacturing performance, or the ion dissolution rate was high.

Specifically, the rubber composition for the cooling hose according to one form of the present disclosure can be prepared using inexpensive materials, in lieu of expensive materials such as silicone rubber, and also, the fuel-cell cooling hose is manufactured using the composition through an extrusion process, rather than an expensive wrapping process, thus generating economic benefits. Moreover, the fuel-cell cooling hose manufactured using the rubber composition described above can exhibit desirable negative-pressure resistance, durability such as bursting strength, and the like, and is capable of effectively preventing ion dissolution, thus increasing the lifetime of a fuel cell.

Although various forms of the present disclosure have been described with reference to the accompanying drawings, those skilled in the art will appreciate that the present disclosure may be embodied in other specific forms without changing the technical spirit or desired features thereof. Thus, the forms described above should be understood to be non-limiting and illustrative in every way.

What is claimed is:

1. A rubber composition for a fuel-cell cooling hose, the rubber composition comprising:
    40 to 62 wt % of a base resin comprising an ethylene-propylene-diene monomer (EPDM);
    30 to 52 wt % of a reinforcing agent;
    2 to 4 wt % of an activating agent;
    2 to 3 wt % of a plasticizer; and
    1 to 2 wt % of a crosslinking agent,
    wherein the reinforcing agent comprises at least one material selected from a group consisting of carbon black, silica, calcium carbonate, and combinations thereof, and
    the carbon black has a dibutylphthalate (DBP) oil absorption rate of 40 to 150 ml/100 g and an iodine adsorption number I2 of 10 to 50 mg/g.

2. The rubber composition of claim 1, wherein the base resin comprises at least one material selected from a group consisting of a metallocene-based EPDM, a Ziegler-Natta-based EPDM, and combinations thereof.

3. The rubber composition of claim 2, wherein the base resin comprises:
    the metallocene-based EPDM, or
    the metallocene-based EPDM and the Ziegler-Natta-based EPDM at a weight ratio of 1:0.3-2.5.

4. The rubber composition of claim 1, wherein the activating agent comprises:
    0.5 to 1 wt % of zinc oxide (ZnO);
    0.5 to 1 wt % of a thermoplastic olefin (TPO); and
    1 to 2 wt % of stearic acid.

5. The rubber composition of claim 4, wherein a weight ratio of the zinc oxide (ZnO) to the thermoplastic olefin (TPO) is 1: 1-2.

6. The rubber composition of claim 4, wherein the thermoplastic olefin (TPO) has a specific gravity of 0.85 to 0.9 g/cm$^3$ and a melt index (MI) of 0.3 to 0.7 g/10 min (190° C./2.16 kg).

7. The rubber composition of claim 1, wherein the plasticizer comprises at least one substance selected from a group consisting of paraffin oil, naphthalene oil, aromatic oil, and combinations thereof.

8. The rubber composition of claim 1, wherein the crosslinking agent comprises at least one compound selected from a group consisting of dicumyl peroxide (DCP), butyl peroxybenzoate, butylperoxy hexane, and combinations thereof.

9. The rubber composition of claim 1, further comprising 1 to 2 wt % of an anti-aging agent.

10. A fuel-cell cooling hose having an ion dissolution rate of 0.7 to 7.0 µS/cm and manufactured by crosslinking a rubber composition, wherein the rubber composition comprises:
- 40 to 62 wt % of a base resin comprising an ethylene-propylene-diene monomer (EPDM);
- 30 to 52 wt % of a reinforcing agent;
- 2 to 4 wt % of an activating agent;
- 2 to 3 wt % of a plasticizer; and
- 1 to 2 wt % of a crosslinking agent.

* * * * *